No. 781,955. PATENTED FEB. 7, 1905.
E. F. KINGSTON.
COMBINED CULTIVATOR AND HARROW.
APPLICATION FILED APR. 18, 1904.
3 SHEETS—SHEET 1.
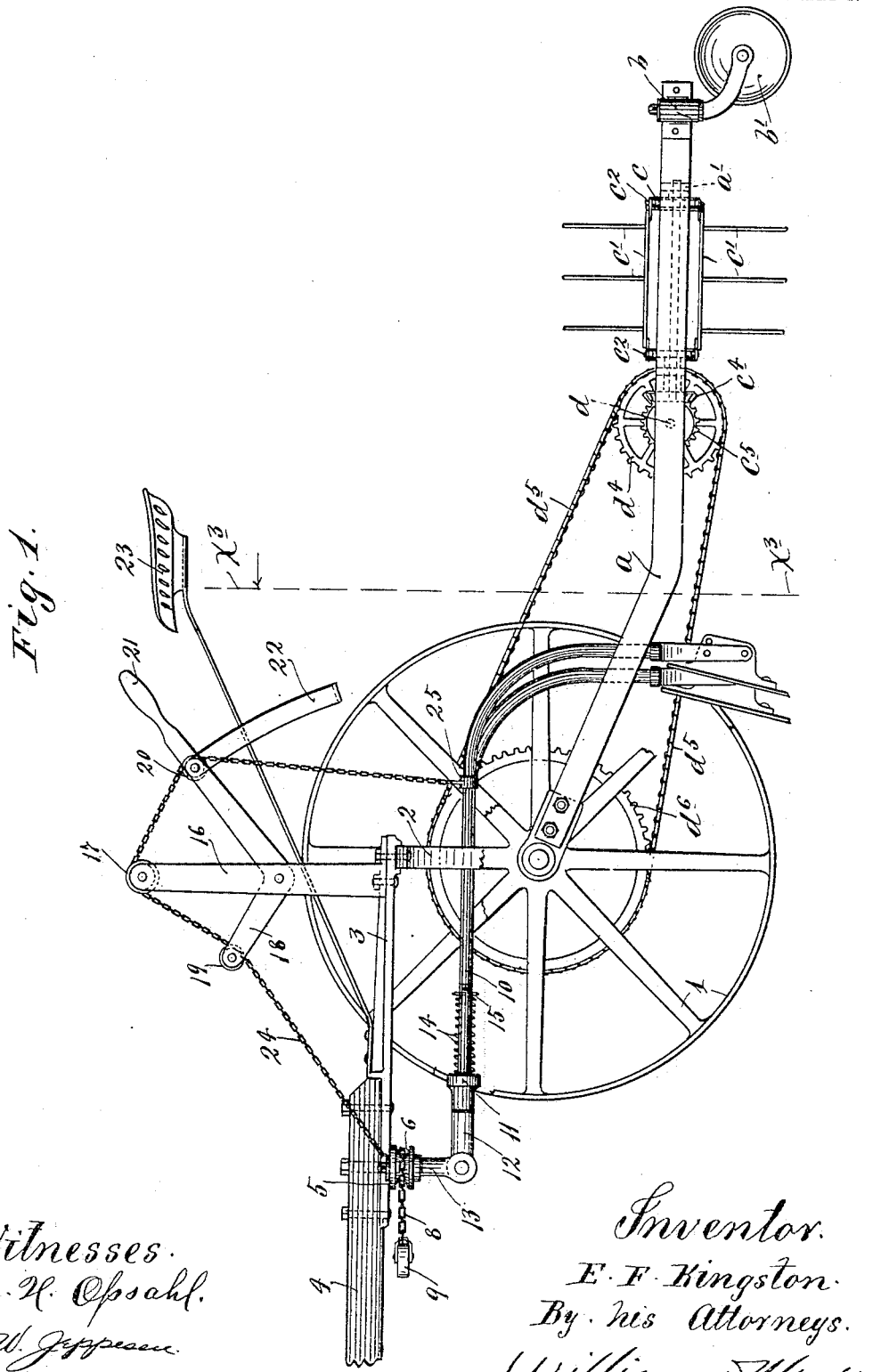
Witnesses
A. H. Opsahl.
E. W. Jeppesen.
Inventor.
E. F. Kingston.
By his Attorneys.
William T. Muchad

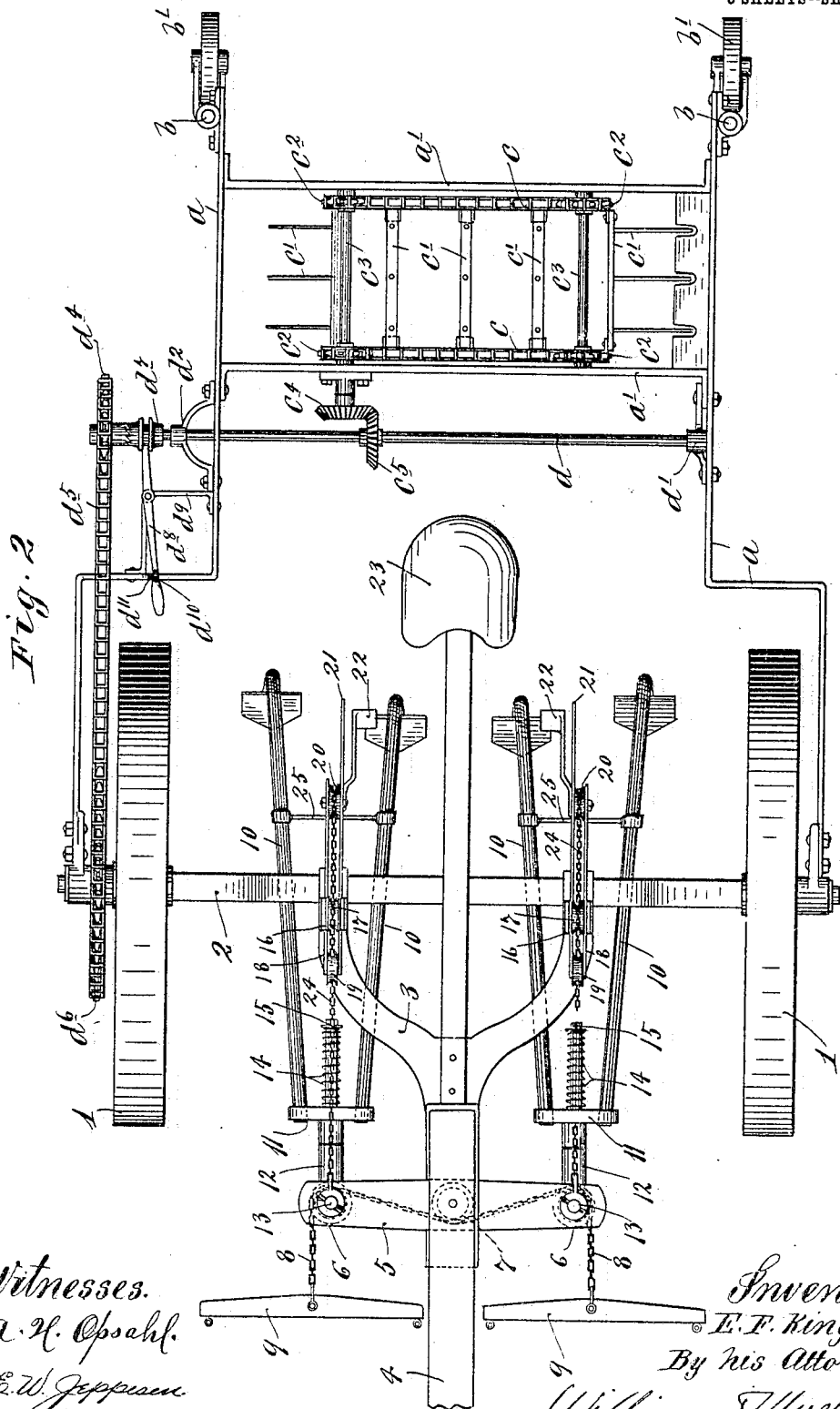

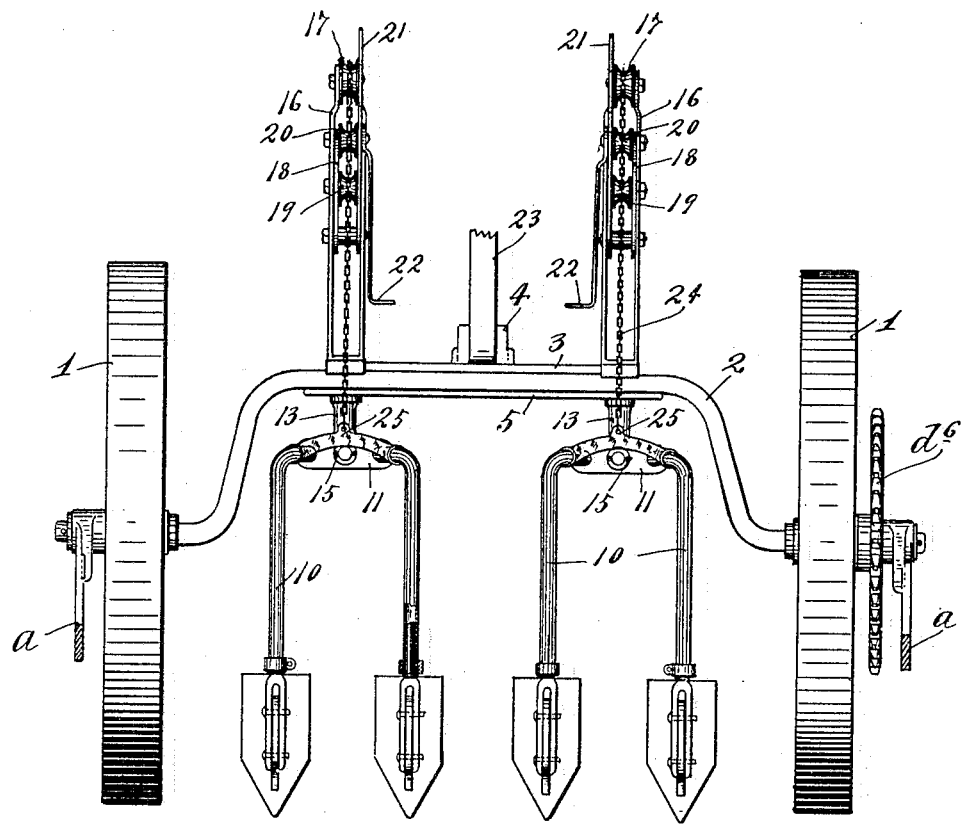

No. 781,955.              Patented February 7, 1905.

UNITED STATES PATENT OFFICE.

EMERY F. KINGSTON, OF HASTINGS, MINNESOTA.

COMBINED CULTIVATOR AND HARROW.

SPECIFICATION forming part of Letters Patent No. 781,955, dated February 7, 1905.

Application filed April 18, 1904. Serial No. 203,577.

*To all whom it may concern:*

Be it known that I, EMERY F. KINGSTON, a citizen of the United States, residing at Hastings, in the county of Dakota and State of Minnesota, have invented certain new and useful Improvements in a Combined Cultivator and Harrow; and I do hereby declare the following to be a full, clear, and exact description of the invention, such as will enable others skilled in the art to which it appertains to make and use the same.

My invention relates to cultivators, and has for its special object to provide a combined cultivator plow and harrow adapted for advantageous use both in working up fallow ground and in the cultivation of corn, potatoes, or other growing plants in the early stages of the growth thereof.

To these ends my invention consists of the novel devices and combinations of devices hereinafter described, and defined in the claims.

The invention is illustrated in the accompanying drawings, wherein like notations refer to like parts throughout the several views.

In said drawings, Figure 1 is a longitudinal sectional elevation with some parts broken away and others removed, illustrating my combined cultivator and harrow as the parts appear when in use. Fig. 2 is a plan view of the machine, and Fig. 3 is a rear end sectional elevation on the line $x^3 x^3$ of Fig. 1 with some parts broken away.

The numeral 1 represents the cultivator-wheels, 2 the arched bar or axle, 3 the pole-tree, and 4 the pole, all of the usual or any suitable construction. To the pole and pole-tree is fixed the forward cross-bar 5 of the frame, which is provided with end sheaves 6 and a central sheave 7, over which works a chain 8, to the outer ends of which the whiffletrees 9 are attached for the draft-animals. The cultivator-beams 10 are fixed to beam or gang heads 11 at their converging or forward ends, which gang-heads are perforated to pass the rear end portions of the drag-bars 12, which, as shown, are pivoted at their forward ends to swivel-heads 13, carried by the forward frame cross-bar 5. Springs 14 encircle the drag-bars 12 between the backs of the gang-heads 11, and suitable stops, shown in the form of cotters 15, seated in the rear ends of the drag-bars 12. These connections afford a spring-coupling between the drag-bars and the cultivator-gangs, thus permitting a yielding action between the said coupled parts in case the shovels meet a retarding obstruction. The pivotal connections noted provide for a universal pivotal motion of the cultivator-gangs in the usual way for the well-known functions.

To the rear ends of the pole-tree arms are fixed upright brackets or standards 16, supporting sheaves 17 at their upper ends. To these brackets or standards 16 are pivoted rockers 18, having sheaves 19 at their forward ends and sheaves 20 at their rear ends. The said rockers 18 are provided with hand-lever arms 21 and foot-lever arms 22 for cooperative use by an operator from a seat 23, suitably supported from the cultivator-frame centrally of the machine and between the two standards 16 and the two sets of hoisting devices. Chains 24, anchored at their forward ends to the fixed cross-bar 5 of the frame, pass under the forward sheaves 19 of the rockers 18, thence over the standard-sheaves 17 and the rear end rocker-sheaves 20, and are connected at their rear or lower ends to the cultivator-gangs. As shown, the cultivator-beams 10 are connected by yokes 25, to which the rear or lower ends of the chains are detachably connected. With this form of hoisting devices a downward motion of the rockers 18 will contract or draw the chains rearward between their points of anchorage and the standard-sheaves 17, thereby raising the cultivator-gangs. For this downward motion of the rockers 18 the driver or operator sitting on the seat 23 may use both his hands and his feet, thus securing the combined leverage for the most advantageous use in the hoisting action.

To the cultivator stub-axles outside the cultivator-wheels, as shown, are pivoted the forward ends of the side bars $a$ of a harrow-frame, which side bars are connected by cross-bars $a'$, rigidly secured thereto and cooperating therewith to form the harrow-frame. The rear ends of the side bars $a$ extend rearward of the back cross-bar $a'$ and are provided with suitable bearings $b$ for swivel wheels or casters $b'$, which serve to support the rear end of the harrow-frame. Endless chains $c$ have attached thereto rake-heads $c'$ and coöperate to form an endless transversely-traveling harrow mounted on the harrow-frame. The said chains $c$ engage with sprockets $c^2$ on sprocket-shafts $c^3$, journaled in the cross-bars $a'$ of the frame, one of which sprocket-shafts has attached to its projecting end one member, $c^4$, of a pair of miter-gears, the other member, $c^5$, of which is on a shaft $d$, journaled in suitable bearings $d'$ $d^2$, fixed in the side bars $a$ of the harrow-frame. The right end of the shaft $d$ has loose thereon a sprocket $d^4$, connected by chain $d^5$ with the main driving-sprocket $d^6$, fixed to the hub of one of the cultivator-wheels 1. If desired, of course a chain-tightener may be applied to the driving-chain $d^5$. The sprocket $d^4$ has a clutch-hub, with which engages a sliding clutch $d^7$, splined to the shaft $d$ and subject to a shipper-lever $d^8$, pivoted to a bracket $d^9$, fixed to the adjacent side bar $a$ of the harrow-frame. With this clutch the shaft $d$ may of course be thrown into and out of gear with the constantly-driven sprocket-wheel $d^4$ whenever so desired. The shipper-lever $d^8$ is shown as provided with a hook $d^{10}$, engageable with the staple $d^{11}$, fixed to the frame-bar $a$, for holding the clutch in its driving position.

With the above-described construction and relation of the parts the action is as follows: Under the forward motion of the cultivator the harrow will be kept in continuous motion traveling crosswise of the supporting-frame, and the teeth of the rake-heads projecting downward from the underrunning folds of the chains will engage with the irregular surfaces of the ground, clods, &c., thrown up by the cultivator-shovels and level the same down. Such an action is very serviceable for the cultivation of corn and other growing plants in the early stages of the growth. The shovels tend to work up the ground in ridges along the row of plants, and more or less of the plants are liable to be covered up by the clods or an excessive amount of soil thrown off from the shovels. The chain-and-rake harrow operating as described will roll away the clods from the plants and by the leveling action on the ground will uncover any of the plants which may have been covered up by the throw from the shovels. The frame of the harrow being pivoted to the cultivator enables the harrow to adapt itself to the irregularities of the ground or to be lifted for cleaning purposes whenever so desired. The sprocket-shafts which support the harrow-chains are set far enough inward from the frame side bars $a$ to afford clearance for the passage of the rake or harrow teeth, as may be clearly seen from an inspection of Fig. 2. The rake-teeth are of course of the proper length or the caster-wheels of the proper size to support the harrow-frame at the proper level for the best action of the rakes. From the fact that the harrow is thus mounted on a frame supported above the level of the ground it follows, of course, that the rakes do not have the same tearing action on the plants which they would have if forced into the ground by the weight of all the parts of the harrow dragging on the ground.

The cross-bars $a'$ of the harrow-frame are deep enough to extend above and below the chain-supporting sprockets, thereby affording side limiting-guides for the rake-heads and chains.

It is of course obvious that the harrow may be detached from the cultivator for independent use of the latter whenever so desired. It is equally obvious that the construction of the harrow might be modified and varied to a considerable extent without departing from the principle of the invention.

What I claim, and desire to secure by Letters Patent of the United States, is as follows:

1. A combined wheeled cultivator and wheeled harrow, with the latter mounted to follow the former, and comprising an endless belt-like conveyer extended transversely of the machine's travel with its under surface running parallel to the ground, having projecting harrow-teeth, substantially as described.

2. The combination with a wheeled cultivator, of a wheeled harrow-frame pivoted to the cultivator, an endless chain-and-rake harrow movable transversely of the said frame with its under surface running parallel to the ground, and a drive for imparting the said traveling movement to said chain-and-rake harrow from the cultivator, substantially as described.

In testimony whereof I affix my signature in presence of two witnesses.

EMERY F. KINGSTON.

Witnesses:
C. S. LOWELL,
CORA M. MAHAR.